United States Patent
Rambler et al.

(10) Patent No.: US 9,405,935 B2
(45) Date of Patent: Aug. 2, 2016

(54) SECURE IMAGE PROCESSING

(71) Applicant: NCR Corporation, Duluth, GA (US)

(72) Inventors: Jason Rambler, Decatur, GA (US); Peter R. Charpentier, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/555,066

(22) Filed: Nov. 26, 2014

(65) Prior Publication Data

US 2016/0148019 A1 May 26, 2016

(51) Int. Cl.
*G06F 21/64* (2013.01)
*H04N 1/44* (2006.01)

(52) U.S. Cl.
CPC ............. *G06F 21/64* (2013.01); *H04N 1/444* (2013.01); *H04N 1/4446* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,839,844 B1* | 1/2005 | Okano | ...................... | G09C 5/00 380/246 |
| 8,295,482 B2* | 10/2012 | Ohara | ...................... | G06F 21/83 380/243 |
| 8,442,221 B2* | 5/2013 | Ming | ...................... | G09C 5/00 380/54 |
| 8,935,536 B2* | 1/2015 | Nakagata | .................. | G09C 5/00 380/255 |
| 2002/0188187 A1* | 12/2002 | Jordan | ...................... | H04N 1/38 600/407 |
| 2004/0165723 A1* | 8/2004 | Yoda | .................. | H04N 1/00968 380/44 |

* cited by examiner

*Primary Examiner* — Beemnet Dada
(74) *Attorney, Agent, or Firm* — Schwegman, Lundberg & Woessner

(57) ABSTRACT

Various embodiments herein each include at least one of systems, methods, devices, and software for secure image processing. In particular, the secure image processing may be performed with regard to images, such as image frames of a video stream, from a camera to obscure, either via image modification, encryption, and discarding image frames, to prevent, limit, or secure viewing of sensitive information that may be included within images. One such embodiment includes receiving an image of an image flow from a scanner, such as a product scanner, and determining whether a sensitive item is present in the image. When a sensitive item is determined to be present in the image, such embodiments perform a security action with regard to the image prior to passing the image in the image flow from the scanner.

12 Claims, 4 Drawing Sheets

SECURE IMAGE PROCESSING

BACKGROUND INFORMATION

Cameras have become prevalent in today's society. In particular in public places, such as stores, and even within modern product scanners at checkout locations where sensitive customer documents may be within view of one or more cameras. As many of these cameras communicate data via computer networks or their image output may otherwise be accesses via computer networks and other computer systems, images from these cameras may be the targets of fraudulent activity to gain access to sensitive customer information, such as credit cards, checks, driver's license data, and the like.

SUMMARY

Various embodiments herein each include at least one of systems, methods, devices, and software for secure image processing. In particular, the secure image processing may be performed with regard to images, such as image frames of a video stream, from a camera to obscure, either via image modification, encryption, and discarding image frames, to prevent, limit, or secure viewing of sensitive information that may be included within images.

One such embodiment includes receiving an image of an image flow from a scanner, such as a product scanner, and determining whether a sensitive item is present in the image. When a sensitive item is determined to be present in the image, such embodiments perform a security action with regard to the image prior to passing the image in the image flow from the scanner.

Another method embodiment includes determining whether a sensitive item is present in an image of an image flow from an imaging device and performing a security action with regard to the image when a sensitive item is determined to be present in the image. The image may then be passed in the image flow from the imaging device.

Other embodiments include devices. In one such embodiment, a device, such as a product scanner, includes at least one processor, at least one memory device, an imaging device, and a communication interface device. The device in this embodiment further includes instructions stored in the at least one memory device and executable by the at least one processor to perform data processing activities. The data processing activities include determining whether a sensitive item is present in an image of an image flow from the imaging device and, when a sensitive item is determined to be present in the image, performing a security action with regard to the image. The security action, in some such embodiments, may include one or more of obscuring sensitive information present in the image, encrypting the image, storing the image in a secure portion of the at least one memory device or other secure data store, and removing the image from the image flow. In embodiments where the image is not removed from the image flow, the data processing activities further include passing the image via the at least one communication interface device to at least one other computing device.

DETAILED DESCRIPTION

Figure 1:
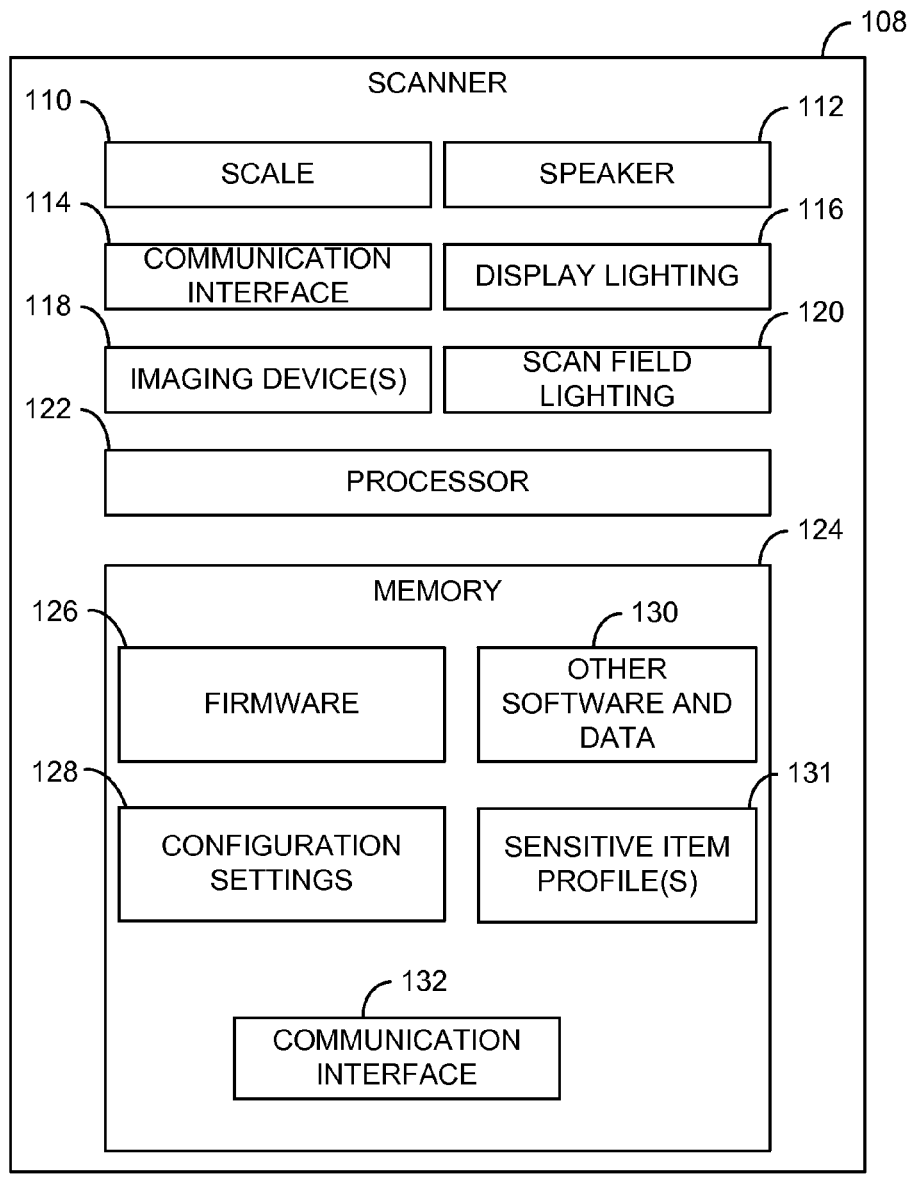
FIG. 1 is a block diagram illustrating the components of a product scanner, according to an example embodiment.

Various embodiments herein each include at least one of systems, methods, devices, and software for secure image processing. In particular, the secure image processing may be performed with regard to images, such as image frames of a video stream, from a camera to obscure, either via image modification, encryption, and discarding image frames, to prevent, limit, or secure viewing of sensitive information that may be included within images.

For example, a camera within a product scanner that works cooperatively with a Point-Of-Sale (POS) terminal may include one or more cameras. An example of such as product scanner is the REALSCAN 79 BI-OPTIC IMAGER available from NCR Corporation of Duluth, Georgia. During a checkout process at a POS terminal, customer often present items that include sensitive information, such as bankcards, driver's licenses, checks that include account numbers and addresses, and other such item. It is common that one or more cameras of product scanner and other cameras deployed at or around the POS terminal will capture images that reveal sensitive information from these customer presented items. Further, image and video output from product scanners and cameras may be accessed via a data network over which the product scanner and the cameras provide images or otherwise communicate over. Additionally, image and video output may be stored in any number of ways. As a result, it has become possible in such environments that sensitive information of customers may be compromised for use in fraudulent acts through image and video output of cameras deployed to increase security at stores and at POS terminals and also during normal operation of POS terminals. The various embodiments herein operate to identify items including sensitive information and to secure identified sensitive information thereon to prevent possible compromising of the sensitive information.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a diagram illustrating components of a product scanner 108 that may be deployed at a checkout station such as a POS terminal, self-service terminal (SST), or other kiosk system including a scanner 108, according to an example embodiment. It is to be noted that the scanner 108 is shown schematically in greatly simplified form, with example components relevant to understanding various embodiments herein. Note that the scanner 108 may include more or fewer components in some embodiments.

Furthermore, the various components included in the FIG. 1 as illustrated and arranged are provided for illustration purposes only. It is to be noted that other arrangements with more or fewer components are possible without departing from the contributions herein, in particular with regard to secure image processing.

Moreover, the methods and scanner 108 presented herein and below may include all or some combination of the components described and shown in the various contexts herein. Further, although the scanner 108 may be paired with a POS terminal, the scanner 108 may be a standalone element or an element of other systems, devices, and terminals in other embodiments. Examples of other terminal-types that may include a scanner 108 are SSTs, clerk operated and self-service library checkout stations, time-keeping terminals, and the like. Additionally, although a scanner is illustrated in FIG. 1 according to some embodiments, the secure image processing described herein may also be implemented with regard to images and video streams generated by other devices, such as stand-alone cameras.

The methods of some embodiments are programmed as executable instructions in memory and/or non-transitory computer-readable storage media and executed on one or more processors associated with the components and devices herein. For example, some embodiments may be deployed as firmware present within the scanner 108, such as firmware 126, or within another device such as a camera or other imaging device. In other embodiments, the secure image processing may be deployed as software on the scanner, a computer of a POS terminal or other terminal, with a network service that receives video from the scanner 108 or other imaging device, in a device driver, and the like.

The scanner 108 may be referred to as a product scanner or barcode scanner as that is the task most commonly associated with such devices. During operation, items are placed within a scan field of the scanner 108. One or more imaging devices 118 of the scanner 108, such as one or more cameras, then scan a barcode and information read therefrom is communicated to a POS system. The POS system then uses that data to identify the item placed within the scan field of the scanner 108 and performs an additional function. The additional function may include a price lookup and addition of the item to a list of items to be purchased, which may be presented on the one or more POS displays.

The scanner 108 may include one or more scan fields, such as two scan fields of bi-optic scanners that are commonly seen in grocery and discount retail outlets. In addition to the imaging devices 118, the scanner 108 may include various other components. The various other components may include an integrated scale 110 such as may be used in a grocery outlet to weigh produce and one or both of a speaker 112 and display lighting 116 to output audio a visual signals such as signals of (un)successful scans. The scanner 108 may also include scan field lighting 120 that may be turned on and off and adjusted based on a detected presence of an item to be scanned.

During typical operation, the scanner 108 is operated according to instructions executed on a processor 122. The processor 122 may be an application integrated circuit (ASIC), digital signal processor, microprocessor, or other type of processor. The instructions may be firmware 126 or software 130 stored in one or more memories 124. The one or more memories 124 may be or include volatile and non-volatile memories, write-protected memories, write-once memories, random access memory (RAM), read only memories (ROM), secure memory, and other memory and data storage types and devices.

The instructions as may be stored in firmware 126 or as software 130 in memory 124 are executed according configuration settings stored in the memory 124. The configuration settings 128 configure operation of the scanner 108 and the various components therein. For example, the configuration settings 108 may configure speaker 112 volume, display lighting 116 outputs, scan field lighting 120 brightness, decoding algorithm of the imaging device(s) 118 and the instructions, one or more communication protocols used to communicate data from the scanner 108 to a POS system or other system via wired or wireless connections, scale 110 operating parameters (e.g., unit of measure as pounds or kilograms), among other configuration settings the particular scanner 108 of an embodiment may include. In some embodiments, the configuration settings 128 may include a firmware version, a software version, and the like. Thus, when a configuration is set or updated, the setting or updating of the configuration settings 128 may include population and updates of any of the configuration settings 128 of a particular embodiment, including an update to firmware and software present on the scanner.

The scanner 108 may include one or more communication interfaces 114, 132 that enable the scanner 108 to communicate via one or both of wired and wireless connections over a network and with other computing devices. In some embodiments, the communication interface 132 may provide a virtualized communication connection on the scanner 108 that enables the scanner to communicate over a network leveraging network connectivity of a terminal or other computing device with which the scanner is paired, such as a POS terminal.

During operation, the one or more imaging devices 118 of the scanner 108 capture images, such as frames of video. This video may be stored within the memory 124 or other data storage device of the scanner 108, a terminal or other device paired therewith, or transmitted via one of the communication interface 114, 132 over a network. In other embodiments, the video is simply captured and processed on the scanner 108 and discarded. However, it may still be possible for a fraudulent actor to remotely access video captured by the one or more imaging devices 118 of the scanner 108 via one or both of the communication interfaces 114, 132. As the scanner 108 is typically present at locations where sensitive items, such as driver's licenses, bank cards, checks, and other such items are presented, the video captured by the one or more imaging devices 118 may capture sensitive information present on these items. As it is conceivable that the captured video may be compromised, various embodiments operate to identify the presence of sensitive information and to prevent this data from being compromised, such as by obscuring the sensitive information, dropping images or image frames including the sensitive information, or encrypting such images or image frames.

To identify images within which sensitive information may be present, sensitive items profiles are defined. A sensitive item profile includes data defining image features a secure image processing function or module utilizes in processing an image to identify a sensitive item. A sensitive item profile may further include data defining a security action to be performed by the secure image processing function or module with regard to an image when a sensitive item is identified therein.

The sensitive item defining data generally includes parameters used to define the sensitive item for an image processing function. The parameter may define shapes, text, symbols, alphanumeric patterns, relative proportions of two or more features, colors, and the like. For example, bankcards, such as credit and debit cards, have a standard shape and typically include card network logos and numbers presented in certain patterns, such as fifteen or sixteen numbers of a bankcard number. Further, driver's licenses and other government issued identification cards include certain patterns of information presentation. Similarly, checks include standardized features.

The security action data of a sensitive item profile generally includes one or more instructions that instruct the secure image processing function or module with regard to one or more actions that are to be performed on an image within which a sensitive item has been identified. Such actions may include obscuring a portion of an image including certain portions of sensitive information, such as an address, bankcard number, account numbers and a signature on a check, and the like. The obscuring may include removing portions of the image including the sensitive information, changing a color of a portion of the image to all the same color such as black or grey, encrypting the image, and even removing the image from an image stream of video.

In some embodiments, the sensitive item profile is stored in a sensitive item profile store 131 in the memory 124. In some embodiments, a plurality of sensitive item profiles may be stored in the sensitive item profile store 131. When a plurality of sensitive item profiles are stored, each image may be evaluated in view of a plurality of sensitive item profiles as a single image may include multiple sensitive items, such as if a customer were to expose a wallet to the scanner 108.

The secure image processing function or module may be present in the scanner 108 as firmware 126, software 130, as a service of another device to which the scanner 108 is paired, a network service accessible via one or both of the communication interfaces 114, 132, and the like.

Figure 2:
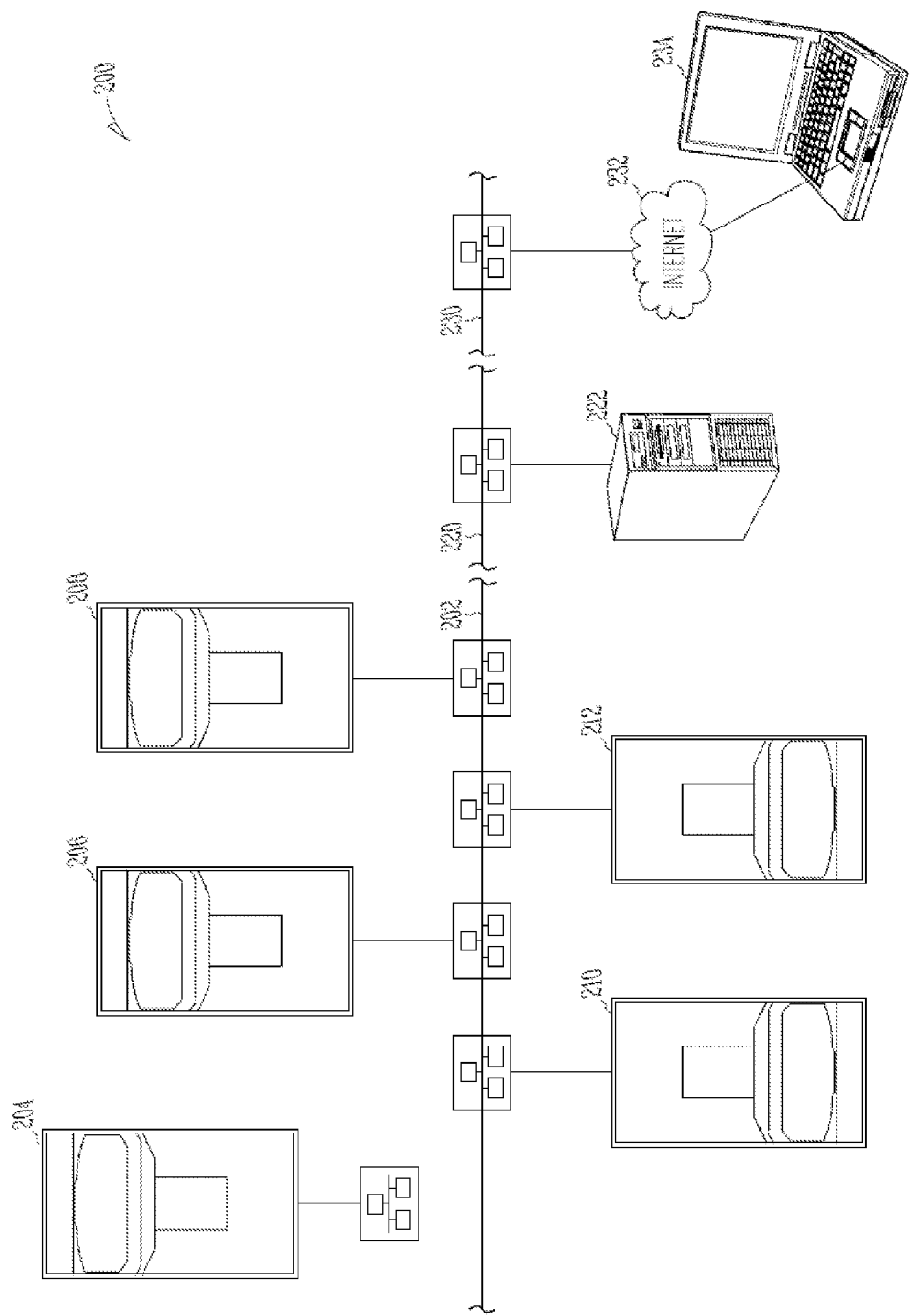
FIG. 2 is a block diagram of networked system components, including a plurality of product scanners, according to an example embodiment.

FIG. 2 is block diagram of networked system 200 components, according an example embodiment. The networked system 200 is a view of a networked system including scanners 206, 208, 210, 212 connected to a network segment 202. The network segment 202 may be a stand-alone network, such as a network within a retail outlet. The network segment 202 may also be part of a larger network that includes additional network segments 220, 230. For example, the network segment 202 may be a store-based network that is also coupled a corporate network segment 220. The corporate network segment 220 may further be coupled to an Internet 232 network segment 230.

The network segment 202 includes the plurality of scanners 206, 208, 210, 212 connected thereto. Although not illustrated and not required in some embodiments, the scanners 206, 208, 210, 212 may also each be individually coupled to terminals, such a POS terminals, self-service kiosks, and the other types of terminals discussed elsewhere herein. The system 200 also includes a scanner 204 that has not yet been connected to the network segment 202. Once the scanner 204 is connected to the network segment 202, the scanner 204 may also communicate over the network segment 202.

In some embodiments, the scanners 204, 206, 208, 210, 212 communicate image and video data they capture over the network either in response to a request from a server 222 or computer 234. In other embodiments, the image and video data may be communicated to the server 222 or other network location as the video is captured or at a defined interval according to scanner configuration settings.

Figure 3:
FIG. 3 illustrates a sensitive item, including an obscuring of sensitive information, according to an example embodiment.

FIG. 3 illustrates a sensitive item, including an obscuring of sensitive information, according to an example embodiment. In particular, FIG. 3 illustrates two views of an image of a check. The first view 302 is an image of a check as captured by an imaging device and including sensitive information 304. The second view 312 is an example of sensitive information of the check, after having been identified, being obscured 314.

The obscuring illustrated in the second view 312 is presented as a blacking out an area of the check image containing bank routing numbers, checking account numbers, and an account holder signature. In other embodiments, the obscuring may include removing the blacked out area of the image entirely or simply removing the image from an image stream, such as a video stream. In some embodiments, prior to obscuring the image of the first view 302, the image may be stored to a secure memory or to a memory in an encrypted form. Similarly, rather than blacking out the sensitive information, the obscuring may alternately include encrypting the entirety of the image of the first view 302.

Figure 4:
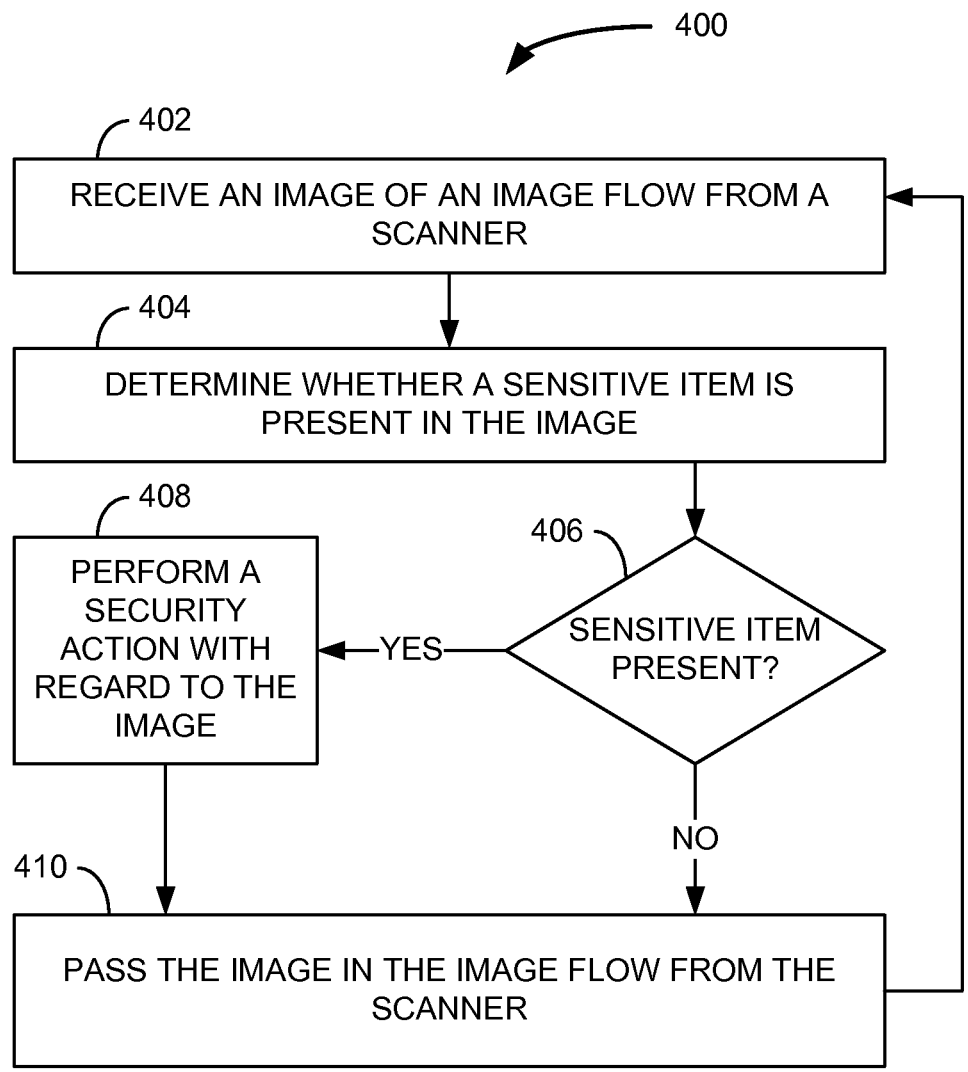
FIG. 4 is a block flow diagram of a method, according to an example embodiment.

FIG. 4 is a block flow diagram of a method 400, according to an example embodiment. The method 400 is an example of a method that may be performed on an image flow received from a scanner, such as the scanner 108 of FIG. 1, or from another imaging device such as a video or still-image camera. The method 400 may be performed in firmware or by software of a scanner or camera or by a process executed by another computing device that receives images or video from a scanner or camera.

The method 400 includes receiving 402 an image of an image flow from a scanner and determining 404 whether a sensitive item is present in the image. When a sensitive item is determined 405 as not present in the image, the image is passed 410 in the image flow from the scanner. When a sensitive item is determined 405 to be present in the image, the method 400 includes performing 408 a security action with regard to the image and passing 410 the image in the image flow from the scanner. The method 400 then continues by receiving a 402 next image in the image flow from the scanner.

In some embodiments, the scanner is a camera-based scanner capable of being communicatively coupled to a point-of-sale terminal and the image of the image flow is an image captured by a camera of one or more cameras of the camera-based scanner.

In some embodiments, determining 404 the sensitive item is present in the image includes comparing parameters of a sensitive item profile with the image to identify whether the parameters are present in the image. The sensitive item profile may be one of a plurality of sensitive item profiles applied when determining 404 whether a sensitive item is present in the image.

In some embodiments, the security action to be performed 408 upon determining 404 the sensitive item is present in the image is defined within data of the sensitive item profile. The security action defined within data of the sensitive item profile may include an instruction to obscure at least a portion of the image within which sensitive information of the sensitive item is present, such as is illustrated and described with regard to FIG. 3. In another embodiment, the security action defined within data of the sensitive item profile includes an instruction to remove the image from the image flow.

In another embodiment, the security action defined within data of the sensitive item profile includes instructions to store a copy of the image to a secure memory and to obscure at least a portion of the image within which sensitive information of the sensitive item is present. In such embodiments, the passing 410 of the image in the image flow from the scanner includes passing 410 the image having at least a portion obscured while the copy stored the secure memory is not obscured.

Another method embodiment includes determining whether a sensitive item is present in an image of an image flow from an imaging device, such as a camera. The method of this embodiment may then perform a security action with regard to the image when a sensitive item is determined to be present in the image. The image may then be passed in the image flow from the imaging device. In some such embodiments, determining whether a sensitive item is present in the image of the image flow from the imaging device includes comparing parameters of sensitive item profiles with the image to identify whether the parameters of one or more sensitive item profiles are present in the image.

In some such method embodiments, a sensitive item profile includes data defining one or more parameters of a sensitive item and data defining at least one security action to be performed with regard to an image within which a sensitive item, defined by the one or more parameters, is determined to be present. The at least one security action typically includes an action to prevent at least a portion of an image including a sensitive item from being included in the image passed in the image flow from the imaging device.

Another embodiment is in the form of a scanner. The scanner of such embodiments includes at least one processor, at least one memory device, an imaging device such as a camera, and a communication interface device such as a wired or wireless network device. Such embodiments also include instructions stored in the at least one memory device as firmware or software that is executable by the at least one processor to perform data processing activities. The data processing activities generally include determining whether a sensitive item is present in an image of an image flow from the imaging device and performing a security action with regard to the image when a sensitive item is determined to be present in the image. The data processing activities also generally include passing the image via the at least one communication interface device to at least one other computing device.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    receiving an image of an image flow from a scanner;
    determining whether a sensitive item is present in the image by comparing parameters of a sensitive item profile with the image to identify whether a sensitive item is present in the image;
    when a sensitive item is determined to be present in the image, performing a security action with regard to the image as defined within or associated with data of the sensitive item profile, the security action defining data including instructions to:
        store a copy of the image to a secure memory; and
        obscure at least a portion of the image within which sensitive information of the sensitive item is present; and
    passing the image having at least a portion obscured in the image flow from the scanner while the copy stored in the secure memory is not obscured.

2. The method of claim 1, wherein the image of the image flow from the scanner is a video frame of a video image flow from the scanner.

3. The method of claim 1, wherein the sensitive item profile is one of a plurality of sensitive item profiles applied when determining whether a sensitive item is present in the image.

4. The method of claim 1, wherein the security action defined within data of the sensitive item profile includes an instruction to obscure at least a portion of the image within which sensitive information of the sensitive item is present.

5. The method of claim 1, wherein the security action defined within data of the sensitive item profile includes an instruction to remove the image from the image flow.

6. The method of claim 1, wherein the scanner is a camera-based scanner capable of being communicatively coupled to a point-of-sale terminal and the image of the image flow is an image captured by a camera of one or more cameras of the camera-based scanner.

7. A method comprising:
    determining whether a sensitive item is present in an image of an image flow from an imaging device by comparing parameters of sensitive item profiles with the image to identify whether the parameters of one or more sensitive item profiles are present in the image, each sensitive item profile including:
        data defining one or more parameters of a sensitive item; and
        data defining at least one security action to be performed with regard to an image within which a sensitive item, defined by the one or more parameters, is determined to be present;
    performing a security action with regard to the image when a sensitive item is determined to be present in the image as defined within or associated with data of the sensitive item profile, the security action defining data including instructions to:
        store a copy of the image to a secure memory; and
        obscure at least a portion of the image within which sensitive information of the sensitive item is present; and
    passing the image having at least a portion obscured in the image flow from the imaging device while the copy stored in the secure memory is not obscured.

8. The method of claim 7, wherein the at least one security action includes an action to prevent at least a portion of an image including a sensitive item from being included in the image passed in the image flow from the imaging device.

9. The method of claim 8, wherein the action to prevent at least a portion of an image including a sensitive item from being included in the image passed in the image flow from the imaging device includes obscuring the portion of the image including sensitive information of the sensitive item.

10. The method of claim 7, wherein the imaging device is a camera embedded within a scanner coupleable to a point-of-sale terminal.

11. A scanner comprising:
  at least one processor;
  at least one memory device;
  an imaging device;
  a communication interface device;
  at least one sensitive item profile is stored in the at least one memory device, each sensitive item profile including:
    data defining one or more parameters of a sensitive item;
    data defining at least one security action to be performed with regard to an image within which a sensitive item, defined by the one or more parameters, is determined to be present; and
  instructions executable by the at least one processor to:
    store a copy of an image in a secure manner within the at least one memory device; and
    obscure at least a portion of the image within which sensitive information of the sensitive item is present;
  instructions stored in the at least one memory device and executable by the at least one processor to perform data processing activities comprising:
    determining whether a sensitive item is present in an image of an image flow from the imaging device by comparing parameters of the at least one sensitive item profile with the image to identify whether the parameters of one or more sensitive item profiles are present in the image;
    performing a security action with regard to the image when a sensitive item is determined to be present in the image; and
    passing the image having at least a portion obscured via the at least one communication interface device to at least one other computing device while the copy stored in the secure memory is not obscured.

12. The scanner of claim 11, wherein the communication interface device is a computer network data communication device.

* * * * *